Figure 1:
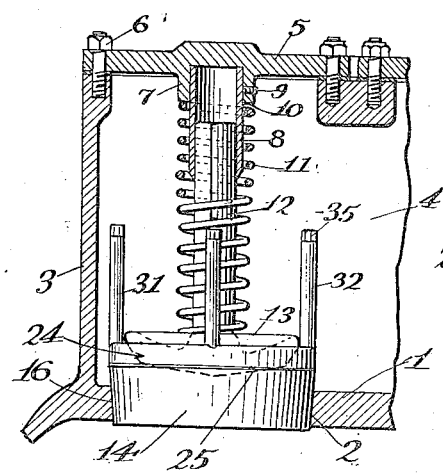

June 28, 1927.

G. E. PUTNAM 1,634,081

VALVE SEAT RETAINER

Filed Sept. 7, 1926

Inventor
G. E. Putnam
by Hazard and Miller
Attorneys

Patented June 28, 1927.

1,634,081

UNITED STATES PATENT OFFICE.

GEORGE E. PUTNAM, OF FULLERTON, CALIFORNIA.

VALVE-SEAT RETAINER.

Application filed September 7, 1926. Serial No. 133,850.

My invention relates to valves and consists in the novel features herein shown, described and claimed.

An object of this invention is to make a valve having a comparatively large opening, to use a rubber seat of comparatively small cross section, and to provide positive means for retaining the rubber valve seat in place.

Other objects and advantages may appear from the drawing and specification.

Figure 2:
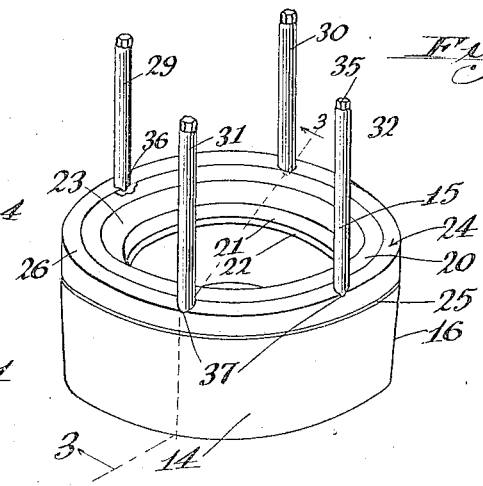
Figure 3:
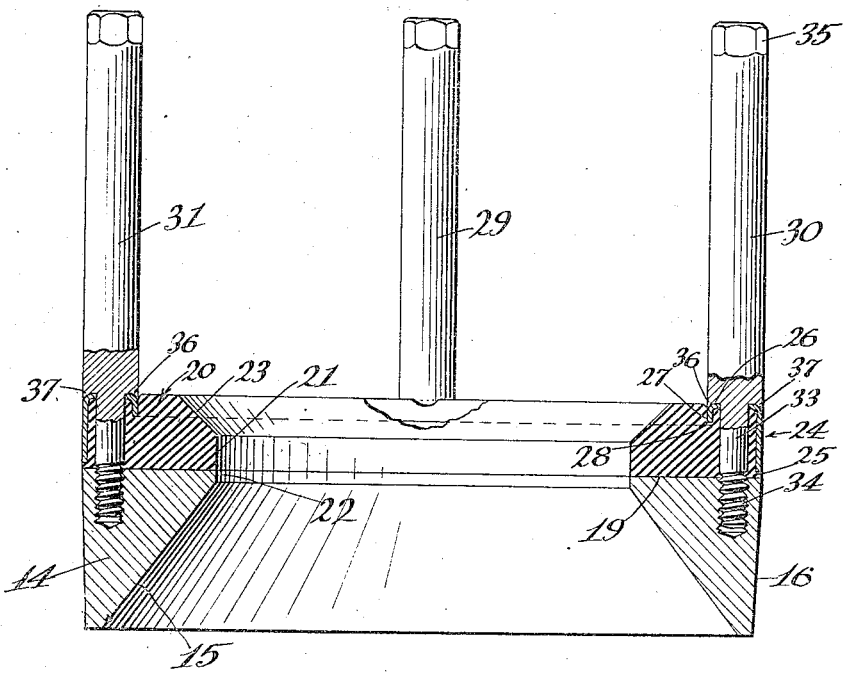

In the drawing:

Figure 1 is a view partly in section and partly in elevation and showing a check valve for use with duplex pumps in connection with a rotary well drilling outfit, Fig. 2 is a perspective of the valve seat support, the rubber valve seat, the retainer for holding the rubber valve seat in place and the posts for guiding the valve plug or head, and Fig. 3 is an enlarged vertical diametrical sectional detail taken substantially on the line 3—3 of Fig. 2.

The base 1 has a vertical opening 2 and a wall 3 extending upwardly from the base 1, and has an opening 4 at one side. A cap 5 fits upon the finished upper edge of the wall 3 and is held in place by cap screws 6. A hub 7 extends downwardly from the central portion of the cap 5. A sleeve 8 fits closely in a bore extending upwardly through the hub 7 into the cap 5 and is held in place by a set screw 9. The sleeve 8 extends a considerable distance downwardly from the hub 7 and the lower face of the hub 7 is finished to form a spring seat 10. An expansion coil spring 11 fits loosely upon the sleeve 8 against the spring seat 10. A valve head stem 12 fits slidingly in the sleeve 8 and the valve head 13 is fixed upon the lower end of the stem 12 and fits against the lower end of the spring 11, the tension of the spring being exerted to force the valve head 13 downwardly.

The valve seat support 14 is an annular ring triangular in cross section having a flaring inner face 15 and a substantially straight slightly tapered outer face 16. The valve seat support fits in the opening 2 in the base 1. The upper face 19 of the valve seat support 14 is flat upon a line or plane cross-wise of the axis of the valve. The rubber valve seat member 20 rests upon this flat face 19 and has a comparatively straight opening 21 substantially the same size as the opening 22 in the valve seat support 14, and the face forming the opening 21 is substantially straight up and down and substantially one-half of the thickness of the valve seat member. From the upper end of the opening 21 the passage through the valve seat member 20 is flared outwardly at an angle of substantially 45° to produce the valve seat proper 23.

As before suggested, the valve seat member 20 is comparatively small in cross section and is of rubber, and it is one of the principal objects of my present invention to provide a retainer for securely holding the valve seat member in place, so that it cannot expand unduly and so that it cannot contract or otherwise move out of place. The retainer proper consists of an annular ring 24 tightly encircling the valve seat member 20. The width of the ring 24 is less than the width of the member 20, so that there is a space 25 between the ring 24 and the face 19. An annular flat plate 26 extends inwardly from the upper edge of the ring 24 and bears upon the valve seat member 20. A flange 27 extends downwardly from the inner edge of the annular flat plate 26 substantially parallel with the ring 24 and is comparatively narrow up and down in cross section. The flange 27 extends into a groove 28 formed from the upper face of the valve seat member 20.

The guide posts 29, 30, 31 and 32 have reduced lower ends 33 to extend through the plate 26 and through the valve seat member 20 and have screw threads 34 screwed into the valve seat support 14 so as to hold the parts securely in place. Wrench seats 35 are formed upon the upper ends of the posts. Lugs 36 and 37 extend from the extreme lower ends of the bodies of the posts diametrically opposite each other. The reduced portions 33, the screws 34 and the wrench seats 35 serve the same purpose as cap screws so far as the retainer is concerned, and if the posts 29, 30, 31 and 32 serving as guides upon the valve head 13 are not desired, cap screws or the like might be used. Then the lugs 36 and 37 would be formed upon the heads of the cap screws.

The ring 24, the plate 26 and the flange 27 are preferably formed of sheet metal pressed into shape and there are rounded corners joining the plate 26 to the ring 24 and the flange 27 to the plate 26, and the lugs 36 and 37 fit these rounded corners and operate like a spring washer or lock nut so that when a post is rotated, the lugs will snap over the plate 26, thereby compressing the rubber slightly and when the posts are turned so that the lugs are upon radial lines relatively to the axis of the valve, the rubber will snap the plate upwardly between the lugs, thus forming a lock nut construction to hold the posts from unscrewing.

The posts 29, 30, 31 and 32 serve to guide the valve head 13 when it is unseated and so that it will properly return to its seat. The ring 24 serves to hold the valve seat member 20 from expanding and the flange 27 serves to hold the valve seat member 20 from drawing inwardly, and the entire construction is adapted to hold the rubber valve seat member 20 securely in place upon the metallic supports 14.

The rubber seat 20 is preferably made of good rubber vulcanized to a comparatively soft condition, that is a hardness between an inner tube and a tire tread, so that if gravel is caught between the valve head and the seat, it will be pressed into the seat without injuring the seat and will be expelled when released. The valve structure above described, while of general application, is especially intended for so-called mud pumps in oil well drilling. The mud, which is a fluid mixture of water and clay, pumped through the drill pipe at the bottom of the hole, quickly wears the packing of the ordinary type of mud pump. By tapering the valve seat support at 15 the liquid, in passing upwardly through the valve seat, will be deflected toward the center and away from the packing therefor, therefore minimizing the wear of the packing.

Various changes may be made without departing from the spirit of my invention as claimed.

I claim:

1. A valve having a metal valve seat support with a flat upper face, a rubber valve seat member resting upon the flat upper face, a ring tightly fitting upon the valve seat member, an annular plate extending inwardly from the upper edge of the ring and fitting upon the outer portion of the valve seat member, a flange extending downwardly from the inner edge of the annular plate into a groove extending downwardly from the upper face of the valve seat member, the ring, the flange and the annular plate being formed integral, and screw means inserted downwardly through the annular plate through the rubber valve seat member and screw seated in the metal valve seat support so as to hold the valve seat member from expanding and so as to hold the valve seat member from stretching or moving inwardly.

2. A valve having a metal valve seat support with a flat upper face, a rubber valve seat member resting upon the flat upper face, a ring tightly fitting upon the valve seat member, an annular plate extending inwardly from the upper edge of the ring and fitting upon the outer portion of the valve seat member, a flange extending downwardly from the inner edge of the annular plate into a groove extending downwardly from the upper face of the valve seat member, the ring, the annular plate and the flange being formed integral, screw means inserted downwardly through the annular plate through the rubber valve seat member and screw seated in the metal valve seat support so as to hold the valve seat member from expanding and so as to hold the valve seat member from stretching or moving inwardly, and lock nut means holding the screws.

3. A valve having a metal valve seat support with a flat upper face, a rubber valve seat member resting upon the flat upper face, a ring tightly fitting upon the valve seat member, an annular plate extending inwardly from the upper edge of the ring and fitting upon the outer portion of the valve seat member, a flange extending downwardly from the inner edge of the annular plate into a groove extending downwardly from the upper face of the valve seat member, the ring, the annular plate and the flange being formed integral, posts having reduced lower ends forming screw means inserted downwardly through the annular plate and through the valve seat member and screw seated in the metal valve seat support.

4. A valve having a metal valve seat support with a flat upper face, a rubber valve seat member resting upon the flat upper face, a ring tightly fitting upon the valve seat member, an annular plate extending inwardly from the upper edge of the ring and fitting upon the outer portion of the valve seat member, a flange extending downwardly from the inner edge of the annular plate into a groove extending downwardly from the upper face of the valve seat member, the ring, the annular plate and the flange being formed integral, posts having reduced lower ends forming screw means inserted downwardly through the annular plate and through the valve seat member and screw seated in the metal valve seat support, and lugs upon the lower ends of the posts to engage the annular plate and form lock nut means.

5. In a valve, a valve seat support, a valve seat of resilient material mounted thereon, posts extending upwardly from the valve seat support, said posts passing through the valve seat and having means for retaining same in position, and forming a guide for a valve head.

6. In a valve, a valve seat support having a converging inside surface in the direction of the flow of the liquid to be pumped, a valve seat of resilient material resting on the valve seat support, posts secured to the valve seat support and extending upwardly through the valve seat, and having means for retaining the valve seat in position and forming a guide for a valve head.

7. In a valve, a valve seat support having a central bore with converging sides in the direction of the flow of the liquid to be pumped, a valve seat of resilient material resting on the support, an annular ring surrounding the valve seat, a plate extending inwardly from the ring over the seat, the plate and the ring being integral, posts secured to the support and extending upwardly through the seat and through the plate, said posts having means for retaining the seat in position and forming a guide for a valve head.

In testimony whereof I have signed my name to this specification.

GEORGE E. PUTNAM.